(12) United States Patent
Marappan

(10) Patent No.: US 11,379,325 B2
(45) Date of Patent: Jul. 5, 2022

(54) PATH FAILURE INFORMATION SHARING BETWEEN HOST DEVICES CONNECTED TO A STORAGE SYSTEM

(71) Applicant: EMC IP Holding Company LLC, Hopkinton, MA (US)

(72) Inventor: Gopinath Marappan, Coimbatore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 413 days.

(21) Appl. No.: 16/593,001

(22) Filed: Oct. 4, 2019

(65) Prior Publication Data

US 2021/0103506 A1 Apr. 8, 2021

(51) Int. Cl.

| G06F 11/00 | (2006.01) |
|---|---|
| G06F 11/20 | (2006.01) |
| G06F 13/16 | (2006.01) |
| G06F 13/40 | (2006.01) |
| H04L 67/55 | (2022.01) |
| H04L 67/1097 | (2022.01) |
| H04L 51/00 | (2022.01) |

(52) U.S. Cl.
CPC ........ *G06F 11/201* (2013.01); *G06F 13/1668* (2013.01); *G06F 13/4027* (2013.01); *H04L 51/16* (2013.01); *H04L 67/1097* (2013.01); *H04L 67/26* (2013.01); *G06F 2201/85* (2013.01)

(58) Field of Classification Search
CPC .............. G06F 11/201; G06F 11/0727; G06F 11/0757; G06F 11/0772; G06F 13/1668; G06F 13/4027; G06F 2201/85; H04L 51/16; H04L 67/1097; H04L 67/26

USPC ...................................................... 714/1–57
See application file for complete search history.

(56) References Cited

U.S. PATENT DOCUMENTS

| 6,567,397 B1 | 5/2003 | Campana et al. |
|---|---|---|
| 6,687,746 B1 | 2/2004 | Shuster et al. |

(Continued)

OTHER PUBLICATIONS

Konstantinos Christidis and Michael Devetsikiotis, "Blockchains and Smart Contracts for the Internet of Things", Apr. 23, 2016, retrieved from file:///H:/e-Red%20Folder/Blockchains_and_Smart_Contracts_for_the_Internet_of_Things%20NPL.pdf (Year: 2016).*

(Continued)

*Primary Examiner* — Sarai E Butler
(74) *Attorney, Agent, or Firm* — Ryan, Mason & Lewis, LLP

(57) ABSTRACT

An apparatus comprises a first host device that is configured to deliver input-output (IO) operations to a storage system over selected ones of a plurality of paths. The first host device is configured to obtain an IO operation that targets a logical volume of the storage system and to transmit the obtained IO operation to the storage system along a given path of the plurality of paths. The first host device is further configured to determine that the given path has failed to convey the obtained IO operation to the storage system and to cause information comprising an indication that the given path has failed to convey the obtained IO operation to the storage system to be provided to a second host device that is also configured to communicate with the storage system using the at least a portion of the given path.

20 Claims, 8 Drawing Sheets

(56) References Cited

U.S. PATENT DOCUMENTS

| | | |
|---|---|---|
| 6,697,875 B1 | 2/2004 | Wilson |
| 7,020,717 B1* | 3/2006 | Kovarik .................. G06F 9/542 |
| | | 707/999.01 |
| 7,454,437 B1 | 11/2008 | Lavallee et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,844,444 B1* | 11/2010 | Asbridge ............... G06F 11/261 |
| | | 703/23 |
| 7,904,681 B1 | 3/2011 | Bappe et al. |
| 7,925,872 B2 | 4/2011 | Lai et al. |
| 8,825,919 B1 | 9/2014 | Lim et al. |
| 8,843,789 B2 | 9/2014 | Sandstrom et al. |
| 8,874,746 B1 | 10/2014 | Gonzalez |
| 8,919,537 B2 | 12/2014 | Sandstrom et al. |
| 9,026,694 B1 | 5/2015 | Davidson et al. |
| 9,400,611 B1 | 7/2016 | Raizen |
| 9,594,780 B1 | 3/2017 | Esposito et al. |
| 9,778,852 B1 | 10/2017 | Marshak et al. |
| 10,353,714 B1 | 7/2019 | Gokam et al. |
| 2004/0010563 A1 | 1/2004 | Forte et al. |
| 2006/0136633 A1* | 6/2006 | Harima ............... H04L 41/0853 |
| | | 710/104 |
| 2006/0277383 A1 | 12/2006 | Hayden et al. |
| 2008/0043973 A1 | 2/2008 | Lai et al. |
| 2009/0006601 A1* | 1/2009 | Masuda ............. H04L 67/1097 |
| | | 709/223 |
| 2011/0197027 A1 | 8/2011 | Balasubramanian et al. |
| 2011/0296230 A1 | 12/2011 | Chen et al. |
| 2014/0025985 A1* | 1/2014 | Tochio ................. G06F 11/2002 |
| | | 714/4.2 |
| 2015/0222705 A1 | 8/2015 | Stephens |
| 2016/0092136 A1 | 3/2016 | Balakrishnan et al. |
| 2016/0117113 A1 | 4/2016 | Li et al. |
| 2016/0179637 A1* | 6/2016 | Winokur ............. G06F 11/2005 |
| | | 714/5.1 |
| 2016/0335003 A1 | 11/2016 | Ahmed et al. |
| 2018/0189635 A1 | 7/2018 | Olarig et al. |
| 2019/0095299 A1 | 3/2019 | Liu et al. |
| 2019/0108888 A1 | 4/2019 | Sarkar et al. |
| 2020/0344662 A1* | 10/2020 | Maino ............... H04W 28/0268 |

OTHER PUBLICATIONS

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al., filed Dec. 21, 2017 and entitled "Storage System with Input-Output Performance Control Utilizing Application Process Detection.".

U.S. Appl. No. 15/795,653 filed in the name of Maneesh Pusalkar et al., filed Oct. 27, 2017 and entitled "Storage System with Network-Wide Configurable Device Names.".

U.S. Appl. No. 16/142,274 filed in the name of Sanjib Mallick et al., filed Sep. 26, 2018 and entitled "Host Device with Multi-Path Layer Implementing Automatic Standby Setting for Active-Active Configuration.".

* cited by examiner

```
Pseudo name=mpathdevice
Storage Array ID=0123456789110
Logical device ID=87654321
Device WWN=12345678912345678912345
state=alive; policy=SymmOpt; queued-IOs=0
===========================================
--------- Host --------- - Stor - -- I/O Path -- -- Stats --
HW Path I/O Paths Interf. Mode State Q-IOs Errors
===========================================
3 qla2xxx sdgs FA 1d:05 active alive 0 0
0 qla2xxx sdhf FA 1d:05 active alive 0 0
3 qla2xxx sdia FA 2d:05 active alive 0 0
0 qla2xxx sdka FA 2d:05 active alive 0 0
```

PATH FAILURE INFORMATION SHARING BETWEEN HOST DEVICES CONNECTED TO A STORAGE SYSTEM

FIELD

The field relates generally to information processing systems, and more particularly to storage in information processing systems.

BACKGROUND

Storage arrays and other types of storage systems are often shared by multiple host devices over a network. A given host device may comprise a multi-path input-output (MPIO) driver that is configured to process input-output (IO) operations for delivery from the given host device to the storage system along a plurality of paths. When the MPIO driver of a given host device determines that a given path among the plurality of paths has failed, for example, due to a timeout or other indication, the MPIO driver typically selects a new path to utilize for delivery of IO operations to the storage array. Requiring MPIO drivers to wait for a timeout or to receive another indication of a path failure, however, may lead to delays in processing of the IO operations and cause other inefficiencies in the storage system.

SUMMARY

In one embodiment, an apparatus comprises a first host device that is configured to communicate over a network with a storage system comprising a plurality of storage devices. The first host device is configured to deliver IO operations from the first host device to the storage system over selected ones of a plurality of paths. The first host device is configured to obtain an IO operation that targets a logical volume of the storage system and to transmit the obtained IO operation to the storage system over a given path of the plurality of paths. The first host device is further configured to determine that the given path has failed to convey the transmitted IO operation to the storage system and to cause information comprising an indication that the given path has failed to convey the transmitted IO operation to the storage system to be provided to a second host device that is also configured to communicate over the network with the storage system using the at least a portion of the given path.

These and other illustrative embodiments include, without limitation, apparatus, systems, methods and computer program products comprising processor-readable storage media.

BRIEF DESCRIPTION OF THE DRAWINGS

FIG. 3 is an illustration of an example multipath device of the information processing system of FIG. 1 in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
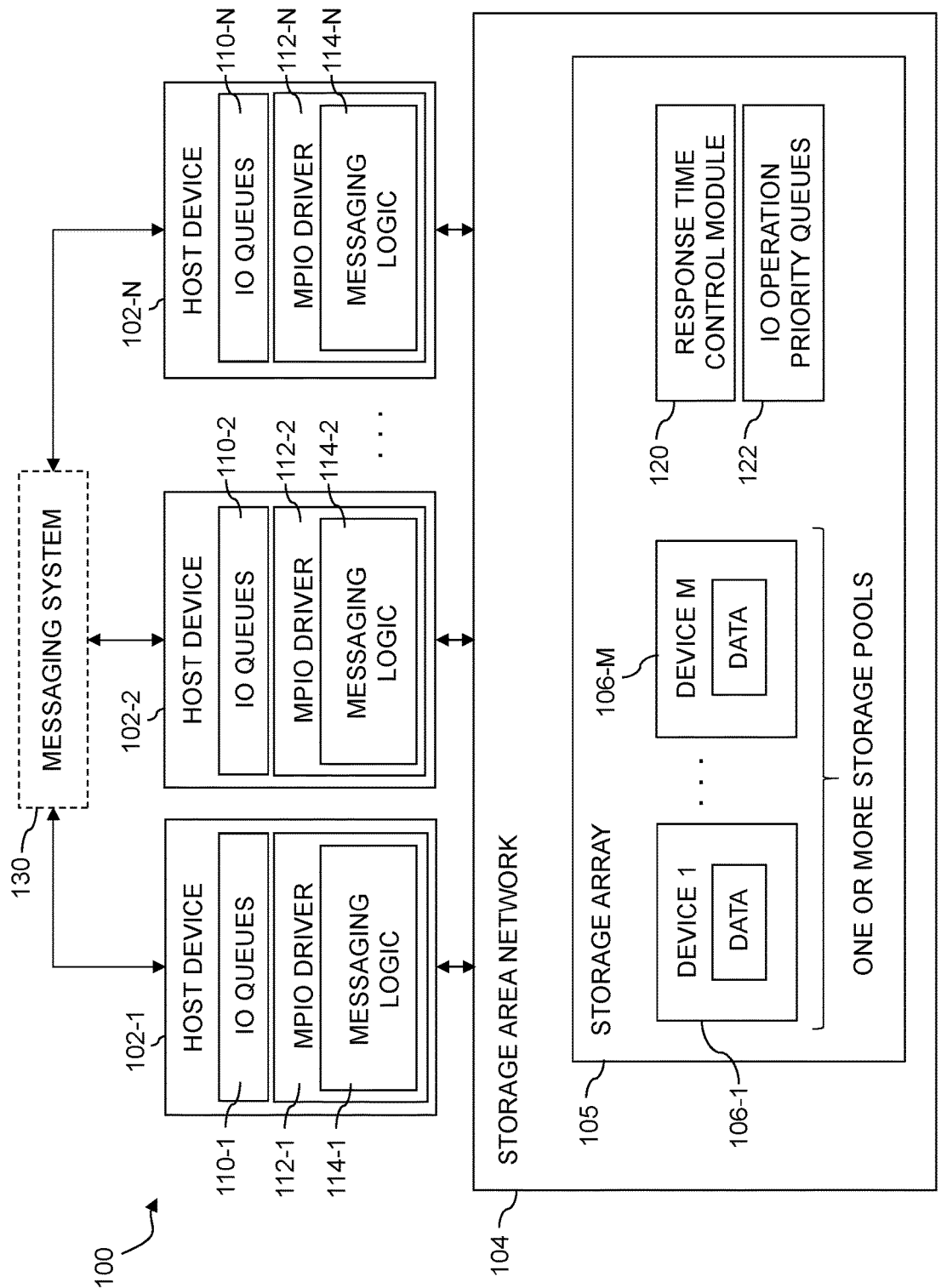
FIG. 1 is a block diagram of an information processing system configured with functionality for path failure information sharing between host devices in an illustrative embodiment.

FIG. 1 shows an information processing system 100 configured in accordance with an illustrative embodiment. The information processing system 100 comprises a plurality of host devices 102-1, 102-2, . . . 102-N, referred to herein collectively as host devices 102. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 is an example of what is more generally referred to herein as a "storage system." This storage system in the present embodiment is shared by the host devices 102, and is therefore also referred to herein as a "shared storage system."

In some embodiments, the host devices 102 may also communicate with a messaging system 130 either over the SAN 104 or over one or more other network connections. Messaging system 130 is utilized by the host devices 102 to convey information between the host devices 102. In illustrative embodiments, messaging system 130 may comprise a subscription-based messaging system such as, e.g., a Message Queuing Telemetry Transport (MQTT) messaging system or any other subscription-based messaging system. In other embodiments any form of messaging system that may be utilized to convey information between the host devices 102 may be used. In some embodiments, the host devices 102 may alternatively communicate directly with each other without using an intermediary messaging system 130.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units or volumes (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for messaging logic 114-1, 114-2, . . . 114-N implemented within the MPIO drivers 112. In some embodiments the messaging logic 114 may alternatively be implemented within the respective host devices 102 separate from the MPIO drivers 112 and may be utilized by the MPIO drivers 112 to communicate with each other, e.g., via messaging system 130.

MPIO drivers typically group all paths from a host device to a logical volume into a single logical device known as a multi-path logical device. The individual block devices representing each path are known as native devices. Applications use a multi-path logical device for IO operations so that the IO operations may be distributed across all available paths. When paths fail, the MPIO driver will typically redirect the IO operations to other alive paths in the multi-path logical device.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In some embodiments, paths are added or deleted in conjunction with the addition of a new communication adaptor or the removal of an existing communication adaptor from the host device.

In these and other situations, path discovery scans may be performed by the MPIO drivers of the multi-path layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

The MPIO drivers described herein may comprise, for example, otherwise conventional MPIO drivers, such as PowerPath® drivers from Dell EMC, suitably modified in the manner disclosed herein to implement functionality for path failure information sharing between host devices. Other types of MPIO drivers from other driver vendors may be suitably modified to incorporate functionality for path failure information sharing between host devices as disclosed herein.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D)(Point™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and messaging logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In an environment having multiple host devices connected to a storage array, such as, e.g., the system a given host device's multipathing software, e.g., an MPIO driver, is typically independent of the multipathing software of the other host devices. For example, the multipathing software of the given host device typically does not share information with the multipathing software of the other host devices that utilize the storage array, but instead determines the path conditions for routing IO operations to the storage array by itself without considering any information from the other host devices.

In a host device running multipath software, the multipath layer typically sits above the SCSI and HBA layers. When the multipath layer dispatches an IO operation, it first goes to the SCSI layer, then the HBA Layer and then conveyed down the communication link to a port of the storage array. If there is a path failure, e.g., a failed port or communication link, after the IO operation has been sent on the communication link, the HBA layer and SCSI layer will typically retry the IO operation on that path for a certain amount of time depending on various parameters or settings. When all of the retries in the two layers timeout, the multipath layer receives an indication of an IO failure and typically redirects the IO operations down another path. Because of this timeout process, there is a delay that is incurred by an application running on the host device due to the failed path even when there are other non-failed paths that may be utilized for communication between the host device and the storage array.

Figure 2:
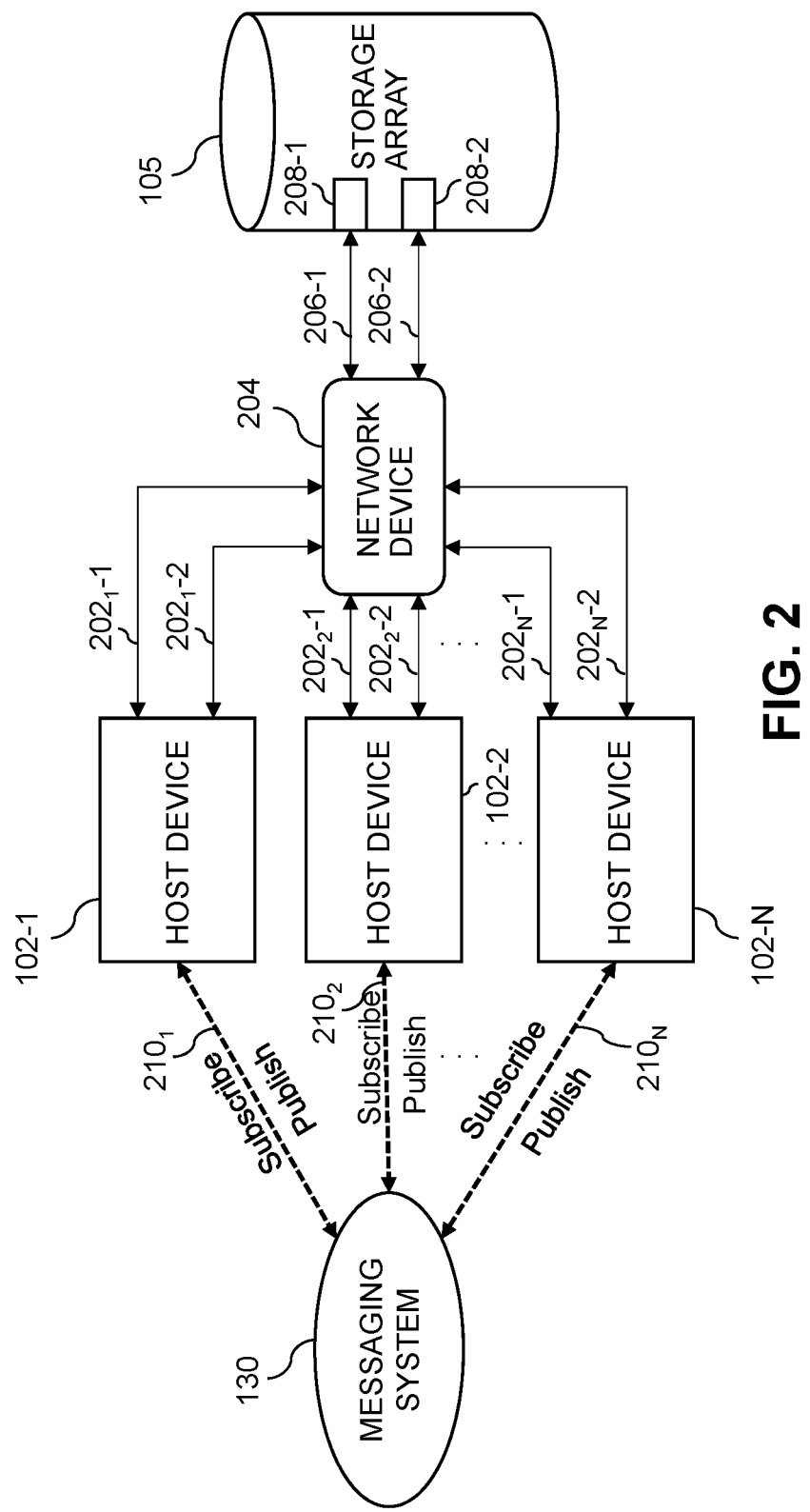
FIG. 2 is a block diagram illustrating an example implementation of the information processing system of FIG. 1 in an illustrative embodiment.

With reference now to FIG. 2, an example configuration of system 100 is illustrated. In FIG. 2, each of the host devices 102 communicates with the storage array 105 via a plurality of paths which utilize a combination of communication links 202, one or more network devices 204, e.g., a switch, communication links 206, and ports 208. While the example of FIG. 2 only illustrates a single switch, two ports, and a number of communication links, any other number of each of these components may also be present in the storage system and utilized to provide communications between the host devices 102 and the storage array 105.

In the illustrated example, host device 102-1 is connected to the network device 204 using communication links $202_1$-1 and $202_1$-2, host device 102-2 is connected to the network device 204 using communication links $202_2$-1 and $202_2$-2, and host device 102-N is connected to the network device 204 using communication links $202_N$-1 and $202_N$-2. Network device 204 is connected to port 208-1 of the storage array 105 using communication link 206-1 and is connected to port 208-2 of the storage array 105 using communication link 206-2. A given path between a host device and the storage array 105 utilizes one of the communication links 202, the network device 204, one of the communication links 206 and one of the corresponding connected ports 208. Although not illustrated in FIG. 2, each host device may also comprise an HBA connected to at least one of the communication links 202 which may be described as an initiator of a path. Each port 208 may likewise be described as a target of a path.

As an example, a first path between host device 102-1 and storage array 105 in the example of FIG. 2 may comprise communication link $202_1$-1, network device 204, communication link 206-1 and port 208-1. A second path between host device 102-1 and storage array 105 in the example of FIG. 2 may comprise communication link $202_1$-1, network device 204, communication link 206-2 and port 208-2. A third path between host device 102-1 and storage array 105 in the example of FIG. 2 may comprise communication link 202$_1$-2, network device 204, communication link 206-1 and port 208-1. A fourth path between host device 102-1 and storage array 105 in the example of FIG. 2 may comprise communication link 202$_1$-2, network device 204, communication link 206-2 and port 208-2. In this example, there are four available paths between host device 102-1 and storage array 105. Host devices 102-2, . . . 102-N may have available paths described in a similar manner. In other embodiments, where there are a smaller or larger number of communication links 202, network devices 204, communication links 206, or ports 208 between the host devices 102 and the storage array 105, a smaller or larger number of paths may alternatively be available.

As seen in FIG. 2, each of the host devices 102 may also communicate with messaging system 130. For example, as seen in FIG. 2, host device 102-1 may communicate with messaging system 130 using a communication link 210$_1$, host device 102-2 may communicate with messaging system using a communication link 210$_2$, and host device 102-N may communicate with the messaging system using a communication link 210$_N$. Communication links 210 may be utilized by the host devices 102 to subscribe to the messaging system 130, to publish information to the messaging system 130, and to receive information from the messaging system 130 that was published by other host devices 102. In some embodiments, communication links 210 may be separate from SAN 104. In some embodiments, SAN 104 may comprise communication links 210.

In an example scenario, multiple host devices 102-1, 102-2, . . . 102-N are connected to the same set of ports, 208-1 and 208-2, on a storage array 105. In this example scenario, one or more of the host devices 102 are actively sending IO operations to the storage array 105 via a given communication link and a given port while others are not at any particular time. For example, host device 102-1 may be actively sending IO operations to the storage array 105 along a path including communication link 206-1 and port 208-1 while host device 102-2 may not be actively sending IO operations along a path including communication link 206-1 and port 208-1. In this example scenario, one of the communication links 206 or ports 208 may fail. For example, communication link 206-1 or port 208-1 may fail. The host devices 102 that are actively utilizing that failed communication link 206 or port 208 will quickly see a timeout or other failure of the IO operations on the relevant paths that utilize that communication link 206 or port 208 and determine that those paths failed to convey the IO operations to the storage array 105. However, those host devices 102 that were not actively sending IO operations to the storage array 105 along paths that utilize the failed communication link 206 or port 208 would not detect such a failure until they later attempted to send an IO message along such paths.

If one or more of the non-active host devices 102 try to start sending IO operations over a path that utilizes the failed communication link 206 or port 208, those IO operations may hang for a predetermined period of time and timeout as described above. For example, the time to timeout may depend on the particular timeout settings of the SCSI and the HBA layers that sit below the multipathing layer. Such a timeout may result in slower response times to the users of applications running on the host devices 102, inefficiencies in the system and wasted system resources. In addition, any subsequent inactive hosts devices 102 that later try to utilize the failed communication link 206 or port 208 without knowing about the failure may also incur these slower response times, system inefficiencies and wasted system resources which further compounds these issues.

In illustrative embodiments, when a given host device 102 determines that a communication link 206 or port 208 has failed, the given host device 102 shares this information with other host devices 102 that are connected to the same storage array 105, e.g., via messaging system 130, so that these other host devices 102 can proactively act on this information to avoid the timeout delays in the IO processing that may occur if they send IO operations on a path that includes the failed communication link 206 or port 208. In this way the other host devices 102 become aware of any path failures when any one of them detects a path failure without having to go through the timeout process, which reduces system delays.

For example, information may be shared across the host devices using a messaging system 130 implementing a connectivity protocol such as, e.g., MQTT. MQTT is a publish-subscribed-based messaging protocol that allows host devices 102 to subscribe to a topic and then receive messages from that topic when they are published to that topic by other host devices 102. A given host device 102 may share path failure information with other host devices 102 by publishing the path failure information on a topic as an MQTT message. For example, the MPIO driver 112 of the host device 102 may subscribe to topics relating to the ports 208 of the storage array 105 that the host device 102 is connected to and then receive MQTT messages from that topic that are published by other host devices subscribed to that topic. For example, each array port 208 may have its own MQTT topic on the messaging system 130. While the techniques described herein utilize MQTT messaging protocols, any other messaging protocol may alternatively be used to facilitate communication between host devices including one-to-one communication protocols, one-to-many protocols, many-to-many communication protocols, other subscription-based communication protocols or any other communication protocols.

As shown in FIG. 2, in one example, hosts 102-1, 102-2 and 102-N are connected to the storage array 105 via a network device 204 using ports 208-1 and 208-2. Hosts 120-1, 102-2 and 102-N also subscribe to topics on a messaging system 130, e.g., an MQTT broker. Each topic is identified by combination of a storage array identifier (ID) and a port identifier. For example, the messaging system 130 may comprise a first topic/Storage array ID/Port1 and a second topic/Storage array ID/Port2.

An example multipath device 300 is described with reference to FIG. 3. As seen in FIG. 3, the multipath device 300 has a storage array ID of 012345678910 and has four listed paths, sdgs, sdhf, sdia, and sdka. Paths sdgs and sdhf utilize port 1d:05 while paths sdia and sdka utilize port 2d:05.

For the above example multipath device 300, the host device 102 will subscribe to the following two topics on the messaging system:

Topic1:/012345678910/1d:05
Topic2:/012345678910/2d:05

For example, the topics may be identified based on the storage array ID of the storage array 105, e.g., 012345678910, and the ports 208 associated with the paths of the multipath device 300, e.g., ports 1d:05 and 2d:05.

Other host devices 102 that are connected to these ports 208 will also be subscribed to the same topics. When any of the host devices 102 send a message comprising information about a failed path that utilizes a particular port to such a topic, e.g., by publishing an MQTT message to the topic comprising information indicating the port 208 associated with the failed path, all other host devices 102 that are subscribed to that topic will receive the message and proactively reroute incoming IO operations to paths that do not utilize the particular port 208.

Figure 4:
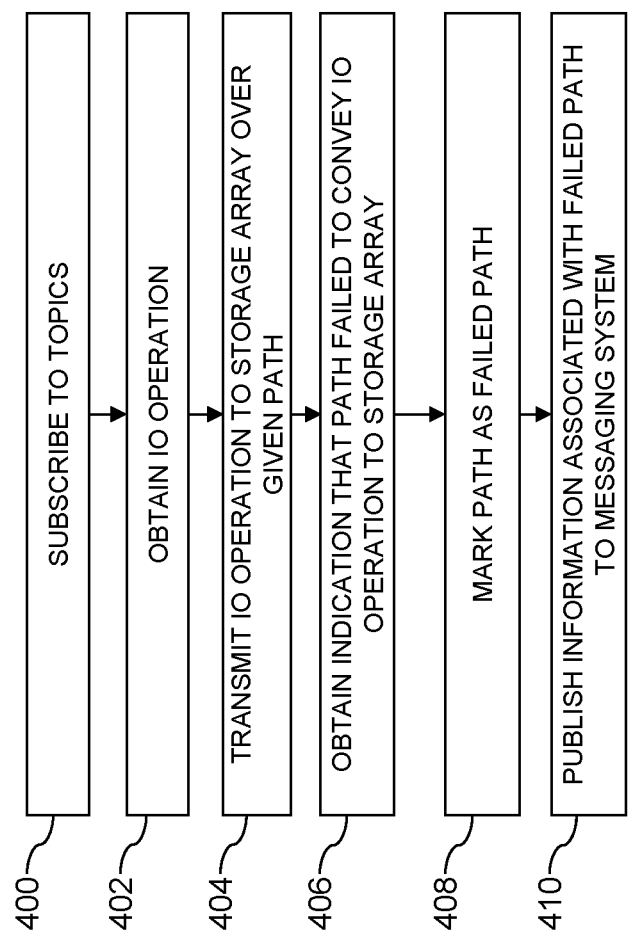
FIG. 4 is a flow diagram of an example process for path failure information sharing between host devices in an illustrative embodiment.
Figure 5:
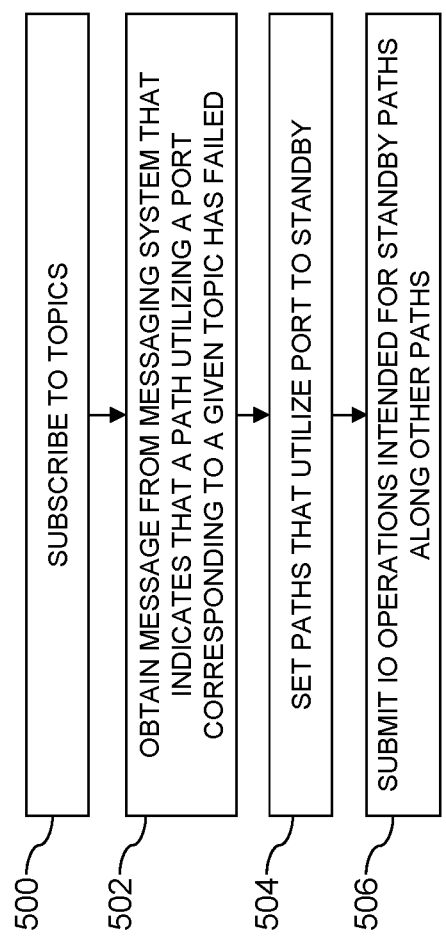
FIG. 5 is a flow diagram of another example process for path failure information sharing between host devices in an illustrative embodiment.
Figure 6:
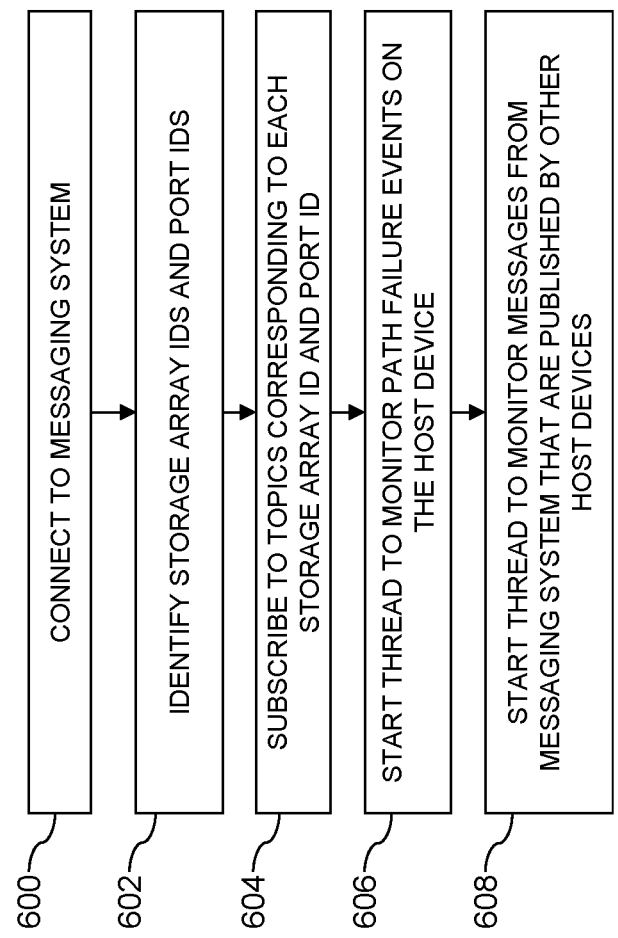
FIG. 6 is a flow diagram of a further example process for path failure information sharing between host devices in an illustrative embodiment.
Figure 7:
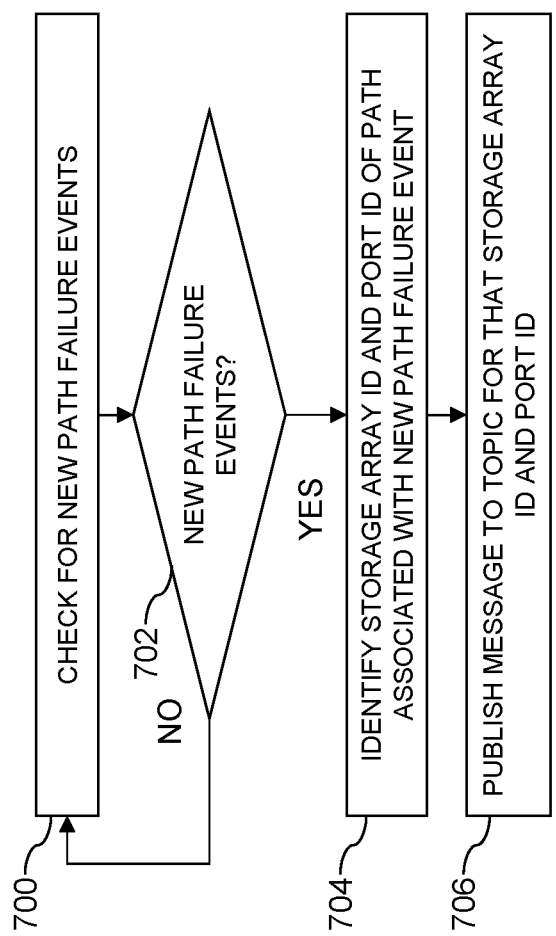
FIG. 7 is a flow diagram of an example process performed during a step of the process of FIG. 6 in an illustrative embodiment.
Figure 8:
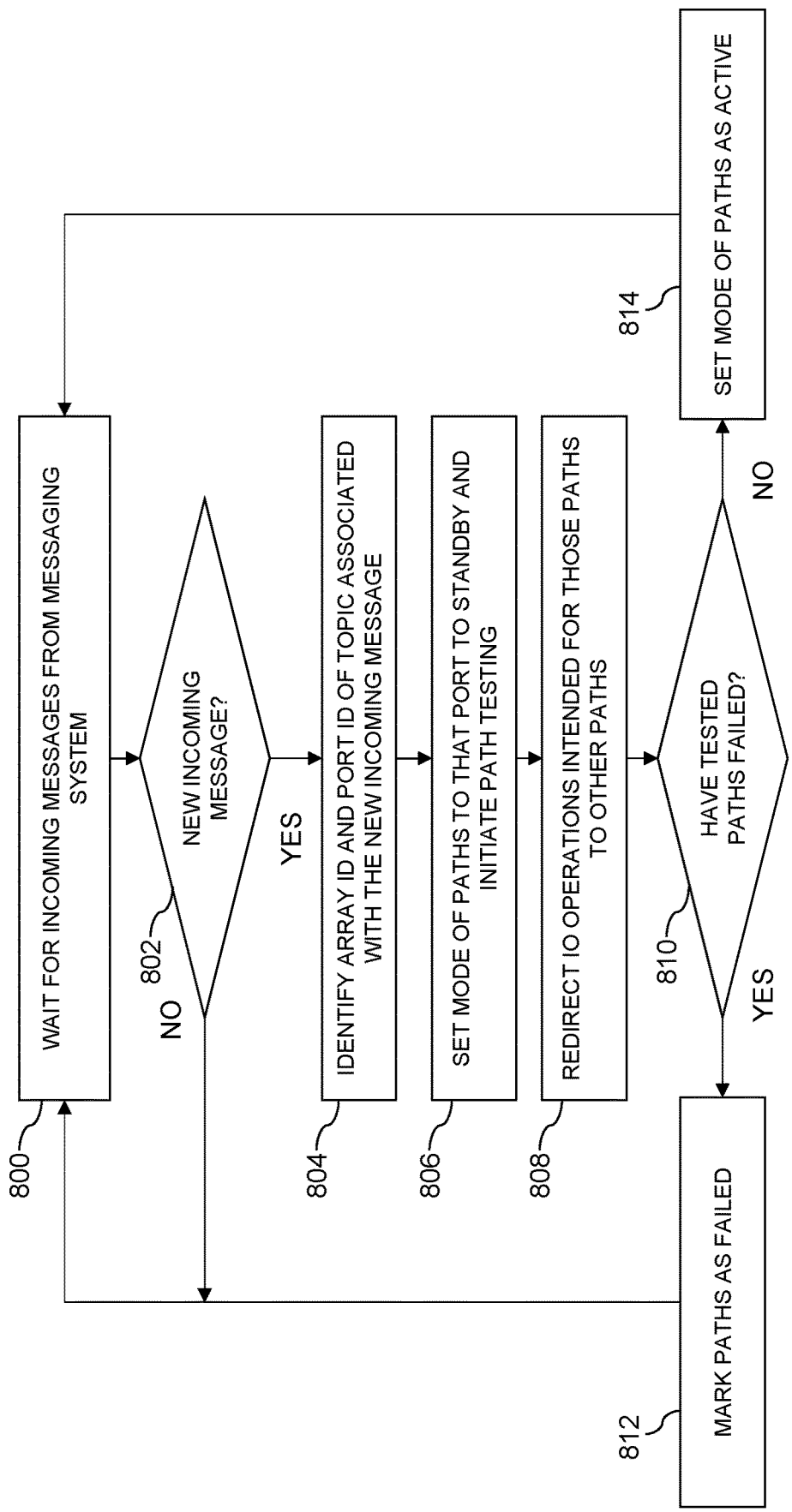
FIG. 8 is a flow diagram of an example process performed during another step of the process of FIG. 6 in an illustrative embodiment.

Illustrative embodiments of the techniques and functionality of messaging logic 114 will now be described in more detail with reference to the flow diagrams of FIGS. 4-8. FIGS. 4 and 5 provide example processes that may be implemented by messaging logic 114 to share path failure information between host devices according to an illustrative embodiment. FIGS. 6-8 provide example processes that may be implemented by messaging logic 114 to share path failure information between host devices according to another illustrative embodiment.

The process as shown in FIG. 4 includes steps 400 through 410, and is suitable for use in the system 100 but is more generally applicable to other types of systems comprising multiple host devices and a shared storage system.

The example process may be triggered by a detection of a path failure for a storage array, e.g., a port 208 or communication link 210 failure, by the multipathing software such as the MPIO driver 112 of a host device 102.

Initially, a group of host devices 102 are connected to a storage array 105, e.g., the example storage array with storage array ID 012345678910 mentioned above. Some of the host devices 102 may be idle while others are actively sending IO operations to the storage array 105 via a variety of paths. As an example, a given host device 102 having multipath device 300 may be actively sending IO operations to the storage array 105 with the storage array ID 012345678910 along paths that utilize ports 1d:05 and 2d:05, as described above.

While the example process of FIG. 4 is described below from the perspective of host device 102-1, any other host device may be configured to perform one or more of the steps of the process of FIG. 4.

At step 400, messaging logic 114-1 of host device 102-1 subscribes to topics in the messaging system 300 that correspond to ports utilized by the paths of MPIO driver 112-1 to convey IO operations from the host device 102-1 to the storage array 105. For example, messaging logic 114-1 may subscribe to the topics /012345678910/1d:05 and /012345678910/2d:05 corresponding to paths sdgs, sdhf, sdia and sdka of the multipath device 300 shown in FIG. 3.

At step 402, MPIO driver 112-1 obtains an IO operation that targets a logical volume of the storage array 105, e.g., from IO queues 110.

At step 404, MPIO driver 112-1 transmits the obtained IO operation to the storage array 105 over a given path, for example, the path that comprises communication link 202$_1$-1, network device 204, communication link 206-1 and port 208-1. For example, MPIO driver 112-1 may transmit the IO operation along path sdgs of the multipath device 300 of FIG. 3 which utilizes port 1d:05.

At step 406, MPIO driver 112-1 determines that the path sdgs has failed to convey the obtained IO operation to the storage array 105. For example, the MPIO driver 112-1 may obtain an indication of a timeout at the SCSI layer or HBA layer which indicates that the path sdgs has failed.

At step 408, messaging logic 114 marks the path sdgs as a failed path. In some embodiments any other path which utilizes the same port as sdgs, e.g., path sdhf, may also be marked as a failed path. In some embodiments, MPIO driver 112-1 may also perform path testing on the paths that are marked as failed paths in an attempt to recover those paths.

At step 410, messaging logic 114 publishes information such as, e.g., an MQTT message, to messaging system 130 for the topic associated with the storage array ID 012345678910 and port 1d:05 associated with the failed path sdgs. In some embodiments, the information comprises an indication that at least a portion of a path utilizing port 1d:05 has failed. In some embodiments the information may simply comprise an identification of the port 1d:05 as being associated with a failed path. In some embodiments, the information may comprise no mention of the port 1d:05. For example, the information may simply comprise a ping of the topic to indicate that the port corresponding with the topic is associated with a failed path without providing any other information about the failure.

The other host devices 102 that are subscribed to the topic /012345678910/1d:05 then receive the published information or an indication that the port corresponding to the topic is associated with a failed path. For example, the messaging system 130 may send an MQTT message to all other host devices 102 that have been subscribed to the topic /012345678910/1d:05.

The other host devices 102 may then proactively set any paths that utilize the port 1d:05 associated with the failed path to a standby state and initiate path testing to determine whether the failure has been recovered. If the path testing determines that the paths are dead, the paths may also be marked as failed paths.

While the paths that utilize port 2d:05 are on standby, any incoming IO operations on the other host devices 102 which would normally be dispatched through those paths will instead be dispatched through other paths that utilize other ports 208 thereby avoiding the increased application latency associated with the timeout process of a failed path as described above.

After path testing is complete, if the standby paths are found to function normally, the standby paths may be set to active and IO operations may be resumed on those paths.

The process as shown in FIG. 5 includes steps 500 through 506, and is suitable for use in the system 100 but is more generally applicable to other types of systems comprising multiple host devices and a shared storage system.

While the example process of FIG. 5 is described below from the perspective of host device 102-2, any other host device may be configured to perform one or more of the steps of the process of FIG. 5.

At step 500, messaging logic 114-2 of host device 102-2 subscribes to topics in the messaging system 300 that correspond to ports utilized by the paths of MPIO driver 112-2 to convey IO operations from the host device 102-2 to the storage array 105, similar to that described above for step 400. For example, messaging logic 114-2 may subscribe to the topics /012345678910/1d:05 and /012345678910/2d:05 corresponding to paths sdgs, sdhf, sdia and sdka of the multipath device 300 shown in FIG. 3.

At step 502, due to the subscription to topic /012345678910/2d:05, messaging logic 114-2 obtains a message from messaging system 300 that indicates that another host device 102 has published information that a path utilizing port 2d:05 has failed.

At step 504, messaging logic 114-2 sets the paths that utilize port 2d:05 to standby and proactively performs one or more paths tests to determine whether or not the paths are dead. If they are dead, they are marked as failed paths.

At step 506, MPIO driver 112-2 submits any IO operations that were intended for submission to one of the standby paths marked to other non-failed paths.

The process as shown in FIG. 6 includes steps 600 through 608, and is suitable for use in the system 100 but is more generally applicable to other types of systems comprising multiple host devices and a shared storage system.

In an illustrative embodiment, the example process of FIG. 6 may be performed by the multipathing software such as the MPIO driver 112 of a host device 102 or another component of a host device 102.

While the example process of FIG. 6 is described below from the perspective of host device 102-1, any other host device may be configured to perform one or more of the steps of the process of FIG. 6.

At step 600, messaging logic 114-1 of host device 102-1 connects to messaging system 130.

At step 602, messaging logic 114-1 identifies the storage array IDs and port IDs for all paths of the MPIO driver 112-1 of the host device 102-1.

At step 604, messaging logic 114-1 subscribes to topics in the messaging system 130 that correspond to the identified storage array IDs and port IDs ports. For example, messaging logic 114-1 may subscribe to the topics /012345678910/1d:05 and /012345678910/2d:05 corresponding to paths sdgs, sdhf, sdia and sdka of the example multipath device 300 shown in FIG. 3.

At step 606, messaging logic 114-1 starts a thread to monitor the host device 102-1 for path failure events. For example, messaging logic 114-1 may monitor the MPIO driver 112-1 for an indication that IO operations submitted along one or more paths have timed-out or failed in any other manner. The process implemented by this thread is described in more detail with reference to the process of FIG. 7 below.

At step 608, messaging logic 114-1 starts a thread to monitor for messages received from the messaging system 130 that are published by other host devices. The process implemented by this thread is described in more detail with reference to the process of FIG. 8 below.

The process as shown in FIG. 7 includes steps 700 through 706, and is suitable for use in the system 100 but is more generally applicable to other types of systems comprising multiple host devices and a shared storage system.

In an illustrative embodiment, the example process of FIG. 7 may be performed, at least in part, by the thread started by messaging logic 114-1 at step 606 of the process of FIG. 6 and by messaging logic 114-1, in illustrative embodiments.

At step 700, the thread of messaging logic 114-1 checks for new path failure events on the host device 102-1. For example, messaging logic 114-1 may monitor the MPIO driver 112-1 for an indication that IO operations submitted along one or more paths have timed-out or failed in any other manner.

At step 702, the thread of messaging logic 114-1 determines whether a new path failure event has occurred. If no new path failure event has occurred, the process returns to step 700. If a new path failure has occurred, the thread indicates to messaging logic 114-1 that a new path failure has occurred and the process proceeds to step 704.

At step 704, messaging logic 114-1 identifies the storage array ID and port ID that were utilized by the path associated with the new path failure.

At step 706, messaging logic 114-1 publishes a message to the topic of messaging system 130 corresponding to the identified storage array ID and port ID.

The process as shown in FIG. 8 includes steps 800 through 814, and is suitable for use in the system 100 but is more generally applicable to other types of systems comprising multiple host devices and a shared storage system.

In an illustrative embodiment, the example process of FIG. 8 may be performed, at least in part, by the thread started by messaging logic 114-1 at step 608 of the process of FIG. 6 and by messaging logic 114-1, in illustrative embodiments.

At step 800, the thread of messaging logic 114-1 checks for incoming messages from messaging system 130, e.g., messages published by other host devices 102.

At step 802, the thread of messaging logic 114-1 determines whether a new incoming message has been received. If no new incoming message has been received, the process returns to step 800. If a new incoming message has been received, the thread indicates to messaging logic 114-1 that a new incoming message has been received and the process proceeds to step 804.

At step 804, messaging logic 114-1 identifies the storage array ID and port ID of the topic associated with the new incoming message.

At step 806, messaging logic 114-1 sets the mode of any paths that utilize the port corresponding to the storage array ID and port ID of the topic to standby and initiate path testing.

At step 808, messaging logic 114-1 redirects any incoming IO operations that were intended for the paths set to standby to other paths, e.g., paths that are still active.

At step 810, messaging logic 114-1 determines whether or not the path testing has failed for one or more of the paths that were set to standby mode. If the path testing fails for a given path, the process proceeds to step 812.

At step 812, the given path that failed the path testing is marked as a failed path. The process then returns to step 800.

Referring back to step 810, if the path testing does not fail for the given path, the process proceeds to step 814.

At 814, the mode of the given path is set to active. Incoming IO operations intended for the given path will now be routed to the given path instead of the other paths. The process then returns to step 800.

Separate instances of the processes of FIGS. 4-8 may be performed in respective additional host devices that share the storage array.

The particular processing operations and other system functionality described in conjunction with the flow diagrams of FIGS. 4-8 are presented by way of illustrative example only, and should not be construed as limiting the scope of the disclosure in any way. Alternative embodiments can use other types of processing operations involving host devices, storage systems and messaging logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different messaging logic arrangements within a given information processing system.

Functionality such as that described in conjunction with the flow diagrams of FIGS. 4-8 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for path failure information sharing between host devices are carried out at least in part under the control of its messaging logic 114. For example, messaging logic 114 is illustratively configured to control performance of portions of the process shown in the flow diagrams described above in conjunction with FIGS. 4-8.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for path failure information sharing between host devices. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support path failure information sharing between host devices.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for path failure information sharing between host devices as disclosed herein, delays in servicing applications may occur since each host device has to individually determine that a particular communication link or port has failed through a lengthy timeout process.

Such drawbacks are advantageously overcome in illustrative embodiments herein by utilization of messaging logic 114 to implement functionality for path failure information sharing between host devices as described above. For example, by allowing host devices to share path failure information, other host devices may determine that particular communication links or ports have failed or are otherwise suspect without waiting for a timeout on IO operations sent along paths that utilize those communication links or ports. The disclosed functionality for path failure information sharing between host devices allows the other host devices to avoid processing delays associated with the timeout process and to instead service IO operations that would utilize the failed or otherwise suspect communication links or ports by using other communication links or ports that have not been found to be failed or suspect.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionalities within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the messaging logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, messaging logic and messaging systems. Also, the particular configurations of system and device elements and associated processing operations illustratively shown in the drawings can be varied in other embodiments. For example, a wide variety of different MPIO driver configurations and associated messaging logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a first host device configured to communicate over a network with a storage system comprising a plurality of storage devices, the first host device being configured to deliver input-output operations from the first host device to the storage system over selected ones of a plurality of paths, the first host device being configured:
to obtain an input-output operation that targets a logical volume of the storage system;
to transmit the obtained input-output operation to the storage system over a given path of the plurality of paths;
to determine that the given path has failed to convey the transmitted input-output operation to the storage system; and
to cause information comprising an indication that the given path has failed to convey the transmitted input-output operation to the storage system to be provided to a second host device that is configured to communicate over the network with the storage system using at least a portion of the given path that has failed.

2. The apparatus of claim 1 wherein:
the first host device is further configured to communicate with a messaging system associated with the second host device; and
causing the information to be provided to the second host device comprises publishing the information to the messaging system, the messaging system configured to provide the published information to the second host device.

3. The apparatus of claim 2 wherein:
the messaging system comprises a subscription-based messaging system; and
the first host device is further configured to subscribe to the messaging system.

4. The apparatus of claim 3 wherein:
the messaging system comprises a plurality of topics, each topic corresponding to one or more paths of the plurality of paths; and
subscribing to the messaging system comprises subscribing to the topic that corresponds to the given path.

5. The apparatus of claim 4 wherein publishing the information to the messaging system comprises publishing the information to the topic corresponding to the given path.

6. The apparatus of claim 2 wherein the first host device is further configured:
to obtain second information from the messaging system, the second information having been published to the messaging system by a third host device, the second information comprising a second indication that at least a portion of a second path of the plurality of paths associated with the first host device has failed to convey an input-output operation to the storage system;
to set the second path to standby; and
to submit input-output operations that would have used the second path to the storage system along at least one other path of the plurality of paths.

7. The apparatus of claim 6 wherein the first host device is further configured to perform path testing on the second path and, responsive to a result of the path testing indicating that the second path is not a failed path, to set the second path to active and allow input-output operations to be submitted on the second path.

8. A method comprising:
obtaining, by a first host device comprising a processor coupled to a memory, an input-output operation that targets a logical volume of a storage system comprising a plurality of storage devices, the first host device being configured to communicate over a network with the storage system, the first host device being configured to deliver input-output operations from the first host device to the storage system over the network over selected ones of a plurality of paths;
transmitting the obtained input-output operation to the storage system over a given path of the plurality of paths;
determining that the given path has failed to convey the transmitted input-output operation to the storage system; and
causing information comprising an indication that the given path has failed to convey the transmitted input-output operation to the storage system to be provided to a second host device that is configured to communicate over the network with the storage system using at least a portion of the given path that has failed.

9. The method of claim 8 wherein:
the first host device is further configured to communicate with a messaging system associated with the second host device; and
causing the information to be provided to the second host device comprises publishing the information to the messaging system, the messaging system configured to provide the published information to the second host device.

10. The method of claim 9 wherein:
the messaging system comprises a subscription-based messaging system; and
the method further comprises subscribing to the messaging system.

11. The method of claim 10 wherein:
the messaging system comprises a plurality of topics, each topic corresponding to one or more paths of the plurality of paths; and
subscribing to the messaging system comprises subscribing to the topic that corresponds to the given path.

12. The method of claim 11 wherein publishing the information to the messaging system comprises publishing the information to the topic corresponding to the given path.

13. The method of claim 9 wherein the method further comprises:
obtaining second information from the messaging system, the second information having been published to the messaging system by a third host device, the second information comprising a second indication that at least a portion of a second path of the plurality of paths associated with the first host device has failed to convey an input-output operation to the storage system;
setting the second path to standby; and
submitting input-output operations that would have used the second path to the storage system along at least one other path of the plurality of paths.

14. The method of claim 13 wherein the method further comprises performing path testing on the second path and, responsive to a result of the path testing indicating that the second path is not a failed path, setting the second path to active and allow input-output operations to be submitted on the second path.

15. A computer program product comprising a non-transitory processor-readable storage medium having stored therein program code of one or more software programs, wherein the program code, when executed by a first host device that is configured to communicate over a network with a storage system comprising a plurality of storage devices, the first host device being configured to deliver input-output operations from the first host device to the storage system over the network over selected ones of a plurality of paths, causes the first host device:
to obtain an input-output operation that targets a logical volume of the storage system;
to transmit the obtained input-output operation to the storage system over a given path of the plurality of paths;
to determine that the given path has failed to convey the transmitted input-output operation to the storage system; and
to cause information comprising an indication that the given path has failed to convey the transmitted input-output operation to the storage system to be provided to a second host device that is configured to communicate over the network with the storage system using at least a portion of the given path that has failed.

16. The computer program product of claim 15 wherein:
the first host device is further configured to communicate with a messaging system associated with the second host device; and
causing the information to be provided to the second host device comprises publishing the information to the messaging system, the messaging system configured to provide the published information to the second host device.

17. The computer program product of claim 16 wherein:
the messaging system comprises a subscription-based messaging system; and
the program code further causes the first host device to subscribe to the messaging system.

18. The computer program product of claim 17 wherein:
the messaging system comprises a plurality of topics, each topic corresponding to one or more paths of the plurality of paths; and
subscribing to the messaging system comprises subscribing to the topic that corresponds to the given path.

19. The computer program product of claim 18 wherein publishing the information to the messaging system comprises publishing the information to the topic corresponding to the given path.

20. The computer program product of claim 16 wherein the program code further causes the host device:
to obtain second information from the messaging system, the second information having been published to the messaging system by a third host device, the second information comprising a second indication that at least a portion of a second path of the plurality of paths associated with the first host device has failed to convey an input-output operation to the storage system;
to set the second path to standby; and to submit input-output operations that would have used the second path to the storage system along at least one other path of the plurality of paths.

* * * * *